(12) United States Patent
Sassounian

(10) Patent No.: US 8,054,618 B2
(45) Date of Patent: Nov. 8, 2011

(54) LAP TOP COVER DISPLAY

(76) Inventor: Sylva A. Sassounian, San Dimas, CA (US)

( * ) Notice: Subject to any disclaimer, the term of this patent is extended or adjusted under 35 U.S.C. 154(b) by 19 days.

(21) Appl. No.: 12/459,167

(22) Filed: Jun. 29, 2009

(65) Prior Publication Data

US 2010/0014239 A1 Jan. 21, 2010

Related U.S. Application Data

(63) Continuation-in-part of application No. 12/218,595, filed on Jul. 17, 2008.

(51) Int. Cl.
*G06F 1/16* (2006.01)
*B65D 85/00* (2006.01)
*A47B 81/00* (2006.01)

(52) U.S. Cl. ......... 361/679.26; 361/679.27; 361/679.55; 206/320; 312/223.1; 312/223.2

(58) Field of Classification Search .......... 361/679.01–679.45, 679.55–679.59; 206/320; 345/156, 157, 168, 169; 312/223.1, 312/223.2

See application file for complete search history.

(56) References Cited

U.S. PATENT DOCUMENTS

| | | | |
|---|---|---|---|
| 5,590,021 A | 12/1996 | Register | |
| 5,592,361 A * | 1/1997 | Smith et al. | 361/679.01 |
| 5,745,340 A | 4/1998 | Landau | |
| 5,796,577 A | 8/1998 | Ouchi et al. | |
| 6,149,001 A * | 11/2000 | Akins | 206/320 |
| 6,267,236 B1 | 7/2001 | Seok | |
| 6,392,876 B1 | 5/2002 | Ramonowski | |
| 6,520,607 B2 | 2/2003 | Pfaff | |
| 6,643,124 B1 | 11/2003 | Wilk | |
| 6,667,877 B2 | 12/2003 | Duquette | |
| 6,686,900 B1 | 2/2004 | Levy et al. | |
| 6,775,128 B2 | 8/2004 | Leitao | |
| 6,778,383 B2 | 8/2004 | Ho | |
| 6,781,825 B2 | 8/2004 | Shih et al. | |
| 6,909,597 B2 | 6/2005 | Tutikawa | |
| 6,967,632 B1 | 11/2005 | Minami et al. | |
| 7,031,148 B1 * | 4/2006 | Lin | 361/679.08 |
| 7,061,472 B1 | 6/2006 | Schweizer et al. | |
| 7,206,618 B2 | 4/2007 | Latto et al. | |
| 7,248,463 B2 | 7/2007 | Bander et al. | |
| 7,280,349 B2 | 10/2007 | Anderson et al. | |
| 7,301,761 B2 | 11/2007 | Merz et al. | |
| 7,545,627 B1 | 6/2009 | Lantigua | |
| 2004/0196209 A1 | 10/2004 | Chen et al. | |
| 2006/0193109 A1 * | 8/2006 | Bander et al. | 361/681 |
| 2006/0198087 A1 * | 9/2006 | Anderson et al. | 361/681 |
| 2006/0226040 A1 | 10/2006 | Medina | |
| 2007/0086154 A1 | 4/2007 | Koch | |
| 2007/0115621 A1 * | 5/2007 | Guillen | 361/683 |
| 2007/0279855 A1 | 12/2007 | Linsmeier et al. | |
| 2008/0043421 A1 | 2/2008 | Staples | |
| 2008/0074833 A1 | 3/2008 | Chien et al. | |
| 2008/0074834 A1 | 3/2008 | Chien et al. | |

* cited by examiner

*Primary Examiner* — Jayprakash N Gandhi
*Assistant Examiner* — Nidhi Desai
(74) *Attorney, Agent, or Firm* — William W. Haefliger

(57) ABSTRACT

A display assembly attachable to a lap top computer cover, having a front face, longitudinally extending laterally spaced edges, and a laterally extending upper edge, comprising a jacket into which a cover is receivable, the jacket having edges adapted to extend externally adjacent corresponding of the cover edges, and means carried by the jacket for visually displaying an image or images, proximate the front face.

41 Claims, 6 Drawing Sheets

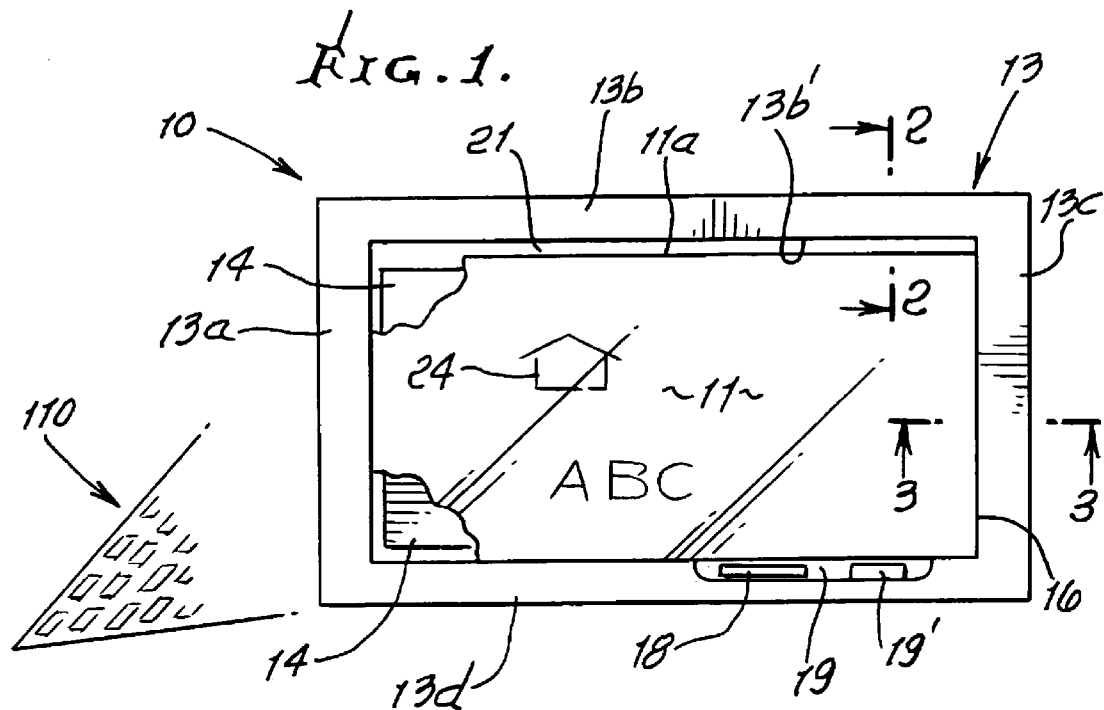
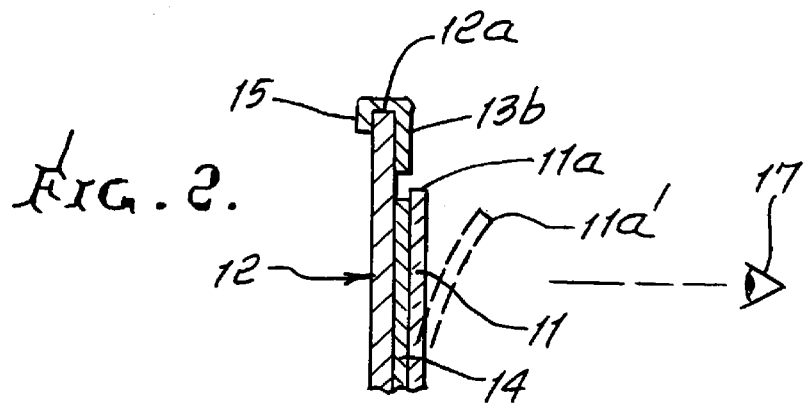
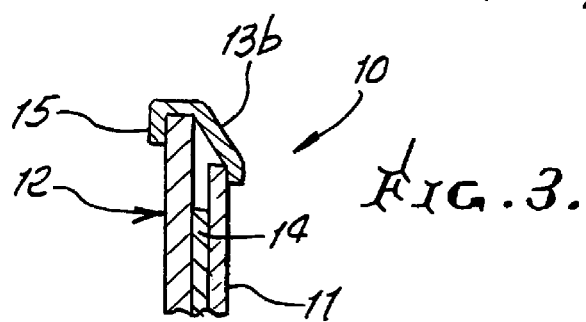

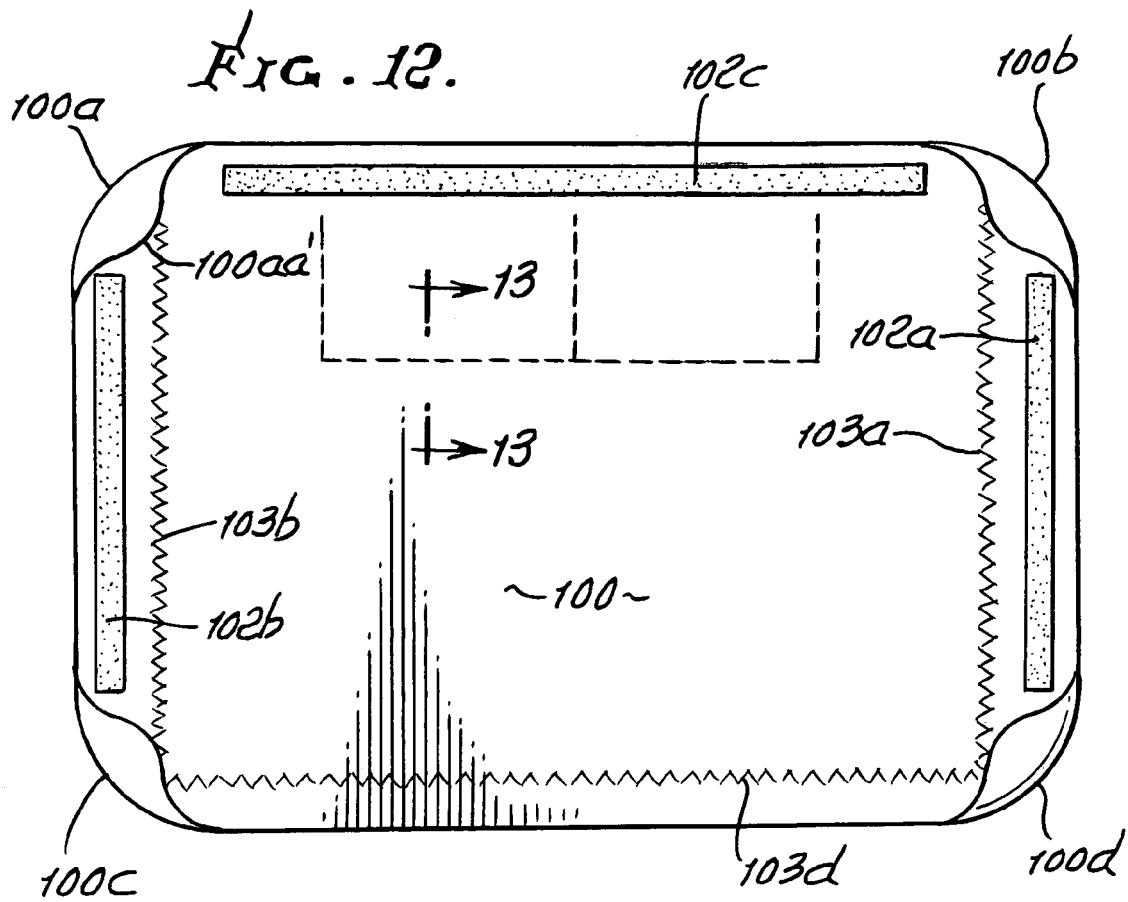
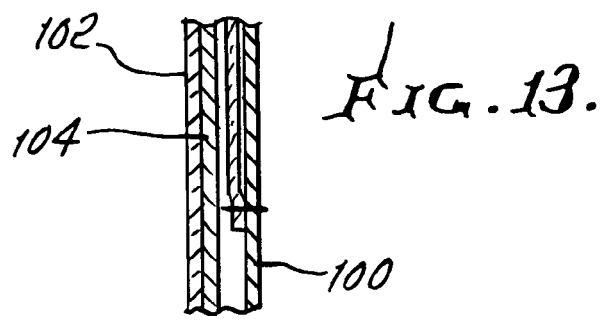

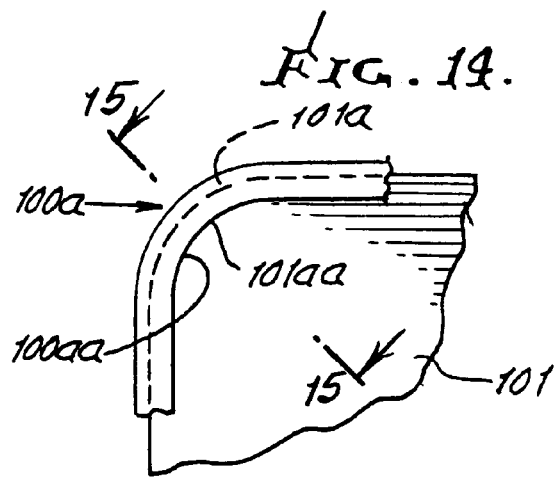
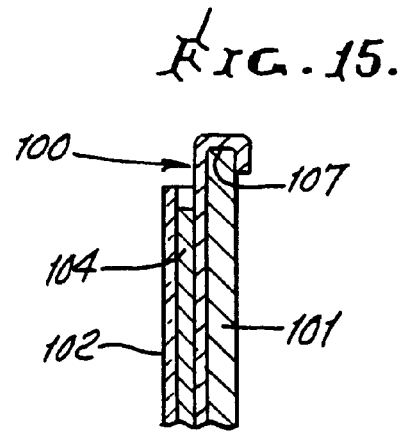
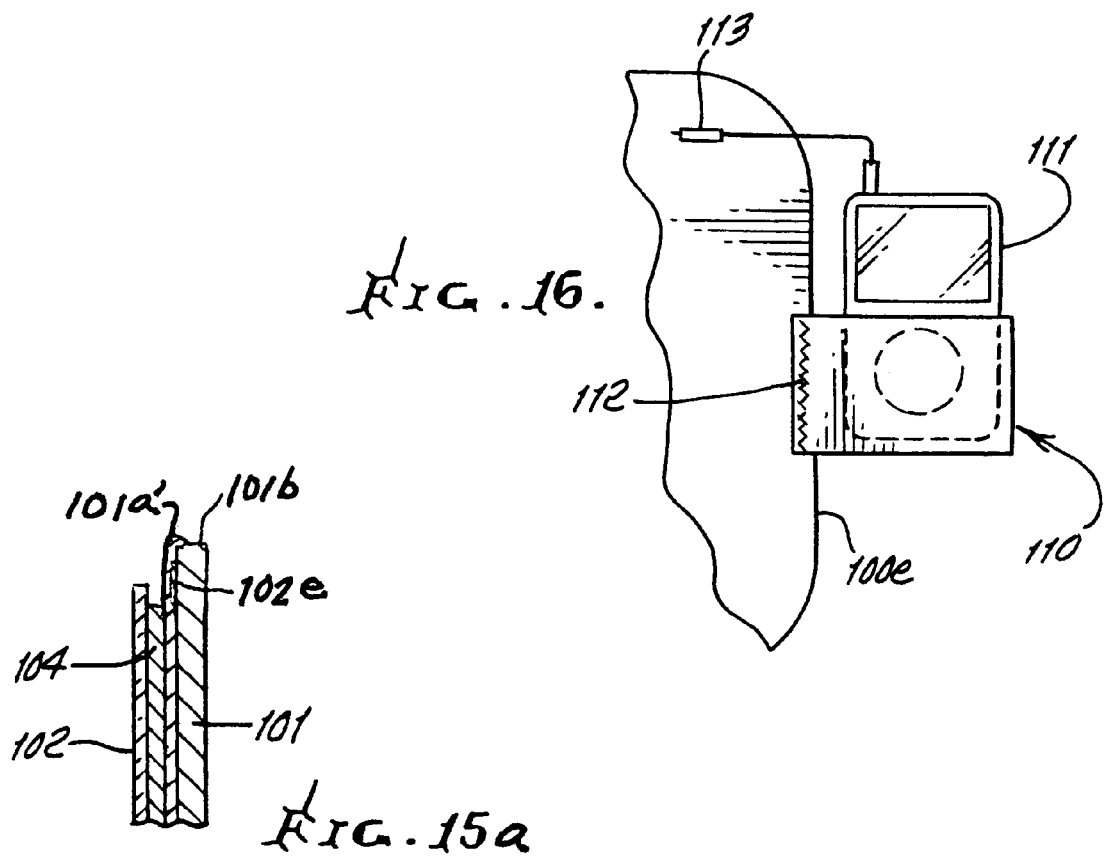

LAP TOP COVER DISPLAY

This application is a continuation-in-part of pending U.S. patent application Ser. No. 12/218,595, filed Jul. 17, 2008.

BACKGROUND OF THE INVENTION

This invention relates generally to enhancement of utility of lap top computers having covers or lids; and more specifically concerns provision of visually observable images in association with structure applied to such covers or lids.

There is a perceived need to enhance the utility of such lap top computer covers, beyond what is digitally provided on screens of such devices. There is also need to provide apparatus enabling displays on such cover, and optimally enabling graphical or written images on such covers.

SUMMARY OF THE INVENTION

It is a major object of the invention to provide improved apparatus meeting such needs. Basically, the apparatus of the invention includes a display assembly attachable to a lap top computer cover, having a front face, longitudinally extending laterally spaced edges, and a laterally extending upper edge, comprising:

a) a jacket into which said cover is receivable said jacket having edges adapted to extend externally adjacent corresponding of said cover edges, b) and means carried by said jacket for visually displaying an image or images, in registration with said front face.

As will be seen, the jacket is typically flexible and easily attached to the lap top cover, as at jacket flexible corners whereby a substantially rectangular image display zone is adapted for presentation opposite or in registration with the lap top cover front face.

Another object includes provision of a transparent panel adapted to extend in closely spaced relation to said cover front, with an image display sheet received therebetween.

Yet another object includes provision of a slot shaped opening located laterally adjacent a lateral edge of said transparent panel for passing said display sheet into the space between said transparent panel and the cover front face.

Yet another object is to provide adhesive structure attached to the jacket to releasably adhere to the cover for positively retaining the jacket to the cover, but enabling forcible release therefrom.

A further object includes provision of
i) a backer sheet,
ii) a visual display sheet viewable through the transparent panel,
iii) both a backer-sheet and a visual display sheet.

An added object includes provision of a carrier attached to the jacket, for receiving an electronic device of hand-held size releasably carried by the jacket, proximate the periphery thereof. The carrier may be releasably retained to the jacket near its periphery.

A further object includes provision of one or more storage pockets carried by the jacket at a side thereof facing toward said transparent panel.

A yet further object includes provision of jacket curved corner pockets curved inwardly over main extent of the jacket, such pockets stretching to reduce their un-stretched size so as to closely and retainingly fit over corners of the computer cover. Adhesive retention of jacket extents between the pockets may be provided.

A further object includes providing a digital frame unit in association with the mounting jacket, to face away from the lap top cover or lid, and so as to enable viewing thereof, and ease of removal from the cover or lid.

These and other objects and advantages of the invention, as well as the details of an illustrative embodiment, will be more fully understood from the following specification and drawings, in which:

DRAWING DESCRIPTION

FIG. 1 is a front view showing preferred apparatus embodying the invention;

FIG. 2 is an enlarged section taken on lines 2-2 of FIG. 1;

FIG. 3 is an enlarged fragmentary section, taken on lines 3-3 of FIG. 1; and

FIG. 12 is a rear view of the modified jacket of FIG. 9;

FIG. 13 is a section taken on lines 13-13 of FIG. 12, to show storage pocket placement;

FIG. 14 is a fragmentary section showing attachment of a stretchable, curved retention pocket to a computer cover; and FIG. 15 is a section taken on lines 15-15 of FIG. 14; and FIG. 15a shows a modification.

DETAILED DESCRIPTION

Figure 4:
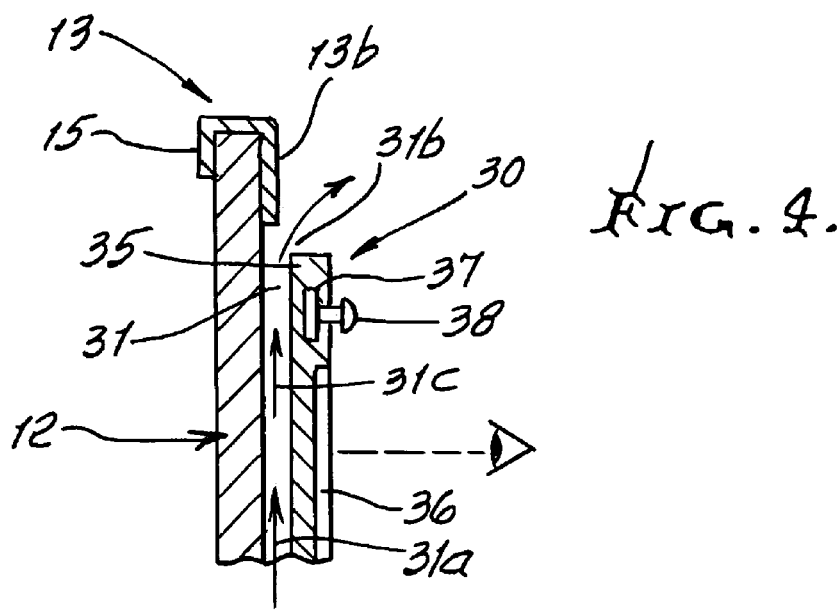
FIG. 4 is a section showing a further modification.

FIGS. 1 and 2 show a cover assembly 10 applicable to the backside of a lap top computer 110 swing up panel 12. The assembly includes a rectangular thin, rectangular frame or jacket 13, preferably flexible and consisting of an elastomer or plastic material, enabling ease of slip-on application to the lap top panel 12. Stretchability of the jacket facilitates ease of slip-on interfit or assembly of the flexible frame pocket-like upper corners 13b to the rigid corners of the lap-top panel 12. The cover frame 13 has thin, elongated border stretches 13a, 13b, and 13c, that stretch lengthwise, and also in cross section, to readily closely fit over the lap top panel edges. FIG. 2 shows horizontal lip 15 that fits over the lap top upper edge 12a, the same close fit provided at the cover frame upright stretches 13a and 13c shown in FIG. 1. Lip or lips 15 can readily be peeled off, to remove the jacket from the lap top cover 12, for storage of the jacket.

Peripherally attached at 16 to the three jacket border stretches 13a, 13c and 13d is a transparent plastic sheet 11, frontwardly viewable as at 17. Sheet 11 is not attached to the jacket top horizontal border stretch 13b, to provide an elongated horizontal access opening 21 between the top edge 11a of sheet 11, and both the panel 12 and the lower edge 13b' of the frame stretch 13b (projecting to a lower level than lip 15). That elongated opening is used to insert a "work" sheet 14, such as a colored template sheet with designs 24 thereon visible at 17, through the transparent sheet 11.

Work or insert sheet 14 (cardboard for example) presents its designs toward plastic sheet 11, which for example can be traced on 11 as by a wet marker 18, shown stored in a jacket pocket 19 in FIG. 1. An eraser 19' can also be stored in the pocket. Various insert sheets 14 for various uses can easily be inserted between 11 and 12, via the elongated upper access opening 21, referred to.

The plastic panel top edge 11*a* (not attached to 13*b*) can be pulled back as at 11*a'*, to enlarge the access opening at 21, for ease of insertion and removal of insert sheets 14. This is facilitated by the resiliently yieldable stretchiness of the frame side stretches 13*a* and 13*c*. The latter when released also pull the plastic sheet back into close proximity to with the inserted insert sheet 11.

FIG. 4 is a further modification, showing a digital frame device 30 carried by the jacket 13, as by edge bonding to the vertical stretches 13*a* and 13*c* as in FIG. 1. A cooling air flow space is provided at 31 between the lap top panel 12 and the rear side of the digital frame, and inlet 31*a* and outlet 31*b* openings protectively allow cooling air flow at 31*c* between the digital frame and the panel. This removes any heat generated by operation of the digital frame, proximate the rear side of the lap top panel. The invention permits ready application i.e. monitoring of a digital frame device, via the flexible jacket 13, which is easily removable, to a lap top computer panel, for use in conjunction with the screen side 12*c* of the panel, so as to provide materially enhanced information display. The digital frame typically has a rectangular frame body 35, a display screen 36, and internal electronic control circuitry 37, controlled by the user, as at 38.

Figure 5:
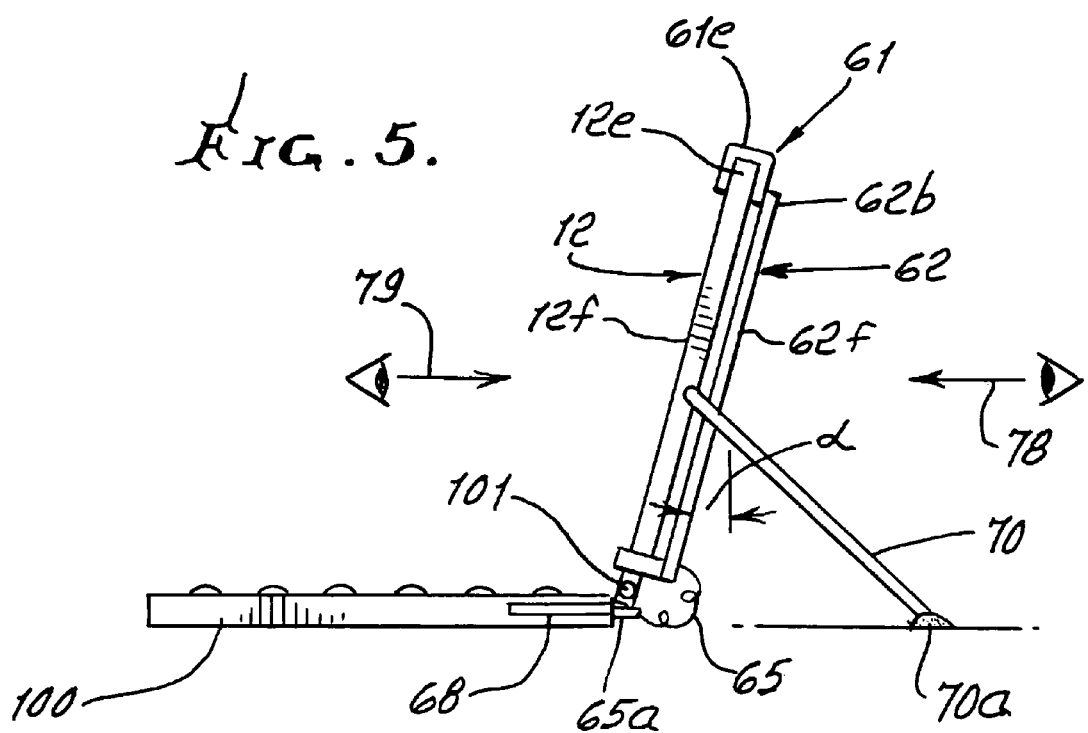
FIG. 5 shows an auxiliary monitor assembled to the lap top computer cover.

FIG. 5 is a section showing a computer lap top monitor panel 60 with a screen facing to the left. A jacket 61, as described above has longitudinal and lateral edges 61*a*-61*d* stretch fitted over the corresponding edges 60*a*-60*d* of the panel 60 so as to enable assembly and disassembly to 60, as and when desired.

FIG. 5 shows that an auxiliary LCD monitor panel 62 is carried by the jacket 61 (like jacket 13) as at four elongated edges 62*a*-62*d*, of 62 and may be connected to 61 as by adhesive bonding, enabling backside viewing in direction 78. The jacket attaches to the lap top panel 12, as at jacket stretchable corners 61*e* fitting over panel 12 corners 12*e*. Panel 62 having viewable screen 62*f* may be electrically connected to the computer circuitry 68 via a line 65 and plug 65*a*.

Accordingly, dual lap top computer screens are provided, as at 12*f* and 62*f*, facing in opposite directions, enhancing utility, and ease of removal of 62 is provided.

An adjustable leg 70 may be pivotally carried at 71 by the jacket 61, to swing down and engage a surface at foot location 70*a*, so that the panel 12 and the angularity α of dual screens may be pivotally adjusted and supported for best viewing in two directions, 78 and 79. Alternatively, the lowermost extent of the panel 12 may be hinge connected to base 100, as at 101, with hinge friction holding the panel in adjusted angle position. Such hinging may be provided for all panels disclosed herein.

Figure 6:
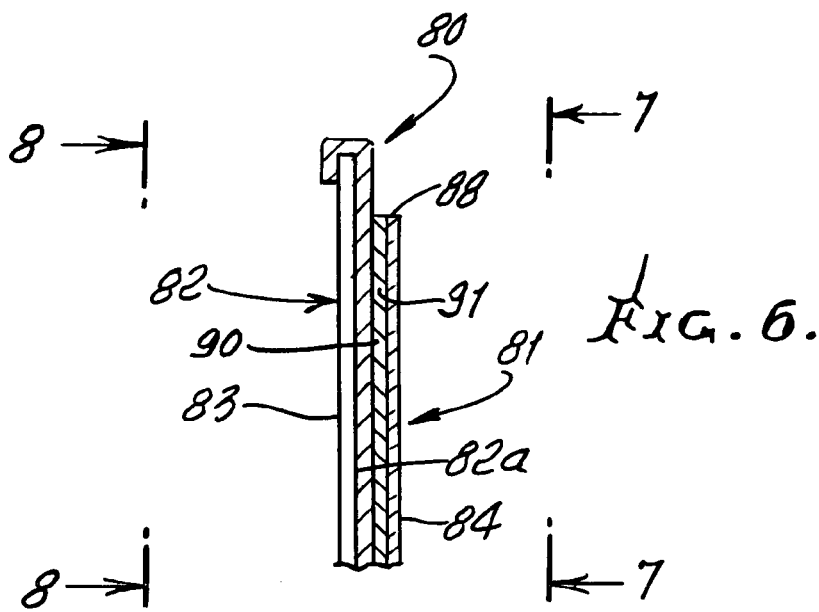
FIG. 6 is a fragmentary section of a modified assembly of elements.
Figure 7:
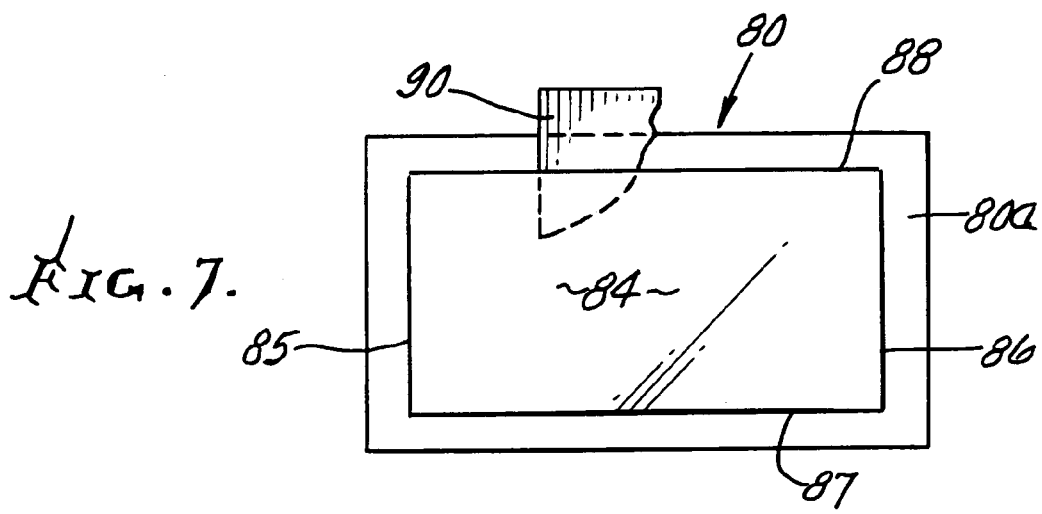
FIG. 7 is a an elevation taken on lines 7-7 of FIG. 6.

FIGS. 6 and 7 show a modification that includes a jacket 80 in the form of an opaque flexible neoprene plastic rectangular sheet 80*a*. Means 81 is provided to be carried by the jacket, for visually displaying an image or images, while the jacket is assembled to a lap top computer rigid cover 82. As shown, the jacket extends adjacent the back face 82*a* of that cover, the front face associated with the display screen indicated at 83.

The means 81 comprises a transparent rectangular plastic sheet 84 having four edges 85-88. Three of the edges 85-87 are heat sealed to the jacket, along such edges. The fourth edge 88 is not sealed to the jacket 80 to allow insertion of a display sheet 90 past edge 88 and into space 91 between the jacket 80 and the transparent sheet 84, at one side of the lap top cover 82 i.e. opposite screen 83 side of the cover.

Figure 8:
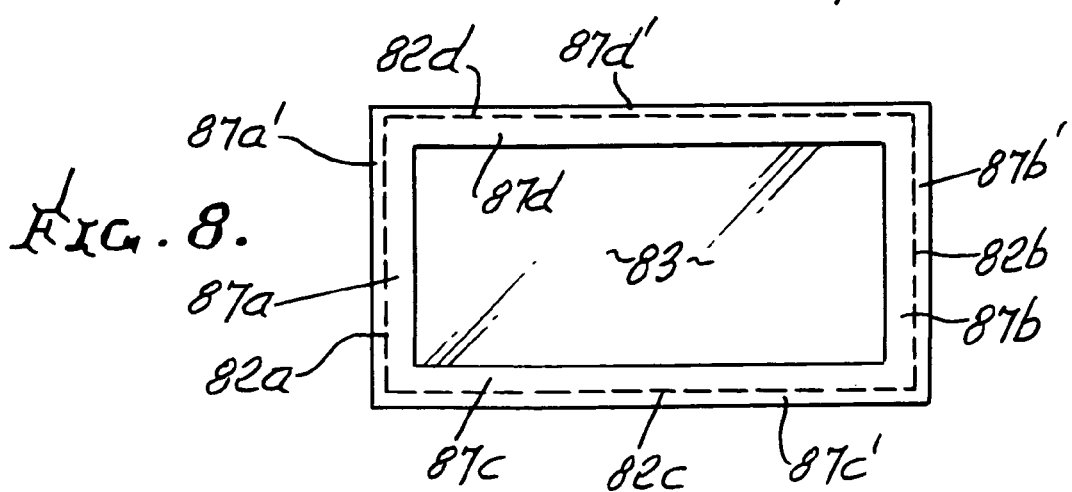
FIG. 8 is an elevation taken on lines 8-8 of FIG. 6.

The jacket 80 has retention edges adapted to extend externally adjacent edges of the lap top cover 82, as for example the four rectangular extending edges of that cover, indicated 82*a*-82*d*, in FIG. 8. Those retention edges are defined by translucent longitudinal and lateral strips 87*a*-87*d*. Strips 87*a*-87*c* are heat sealed to the jacket material along strip outer edges 87*b'*-87*d'*. Strip 87*a* is not heat sealed to the jacket material, but is left loose, to facilitate ease of slip-on attachment of the jacket to the computer cover.

Stitching may be used instead of heat sealing, in the above.

Referring now to FIGS. 9-13, they show a preferred form of the invention, having a jacket 100 with curved corners 100*a*-100*d*, to cover curved corners of a lap top computer cover 101. See FIG. 14 with cover convexly curved corner 101*a*. Stretched jacket cover 100*a* compressively fits cover 101*a*, the inner edge 101*aa* of 100*a* stretched outwardly from its relaxed convex position seen at 100*aa'*, in FIG. 12 to its stretched concave position 100*aa* in FIG. 14. The jacket consists of resiliently yieldable, thin plastic material. All four corners of the jacket are alike in such construction, allowing attachment to lap top covers of limited different length and width dimensions.

Also provided is adhesive structure attached to the jacket to releasably adhere to the cover for positively retaining the jacket to the cover, but enabling forcible release therefrom. See for example the adhesive strips 102*a*-102*c* attached to the jacket at three locations, as shown, and presenting adhesive surfaces to attach to the cover corresponding edge portions as shown for example in FIG. 11, with adhesive 102*b* releasably attaching to the cover 100, when the jacket is applied to the cover. Easy release allows bending, folding, and storage of the jacket and associated structure.

Figure 9:
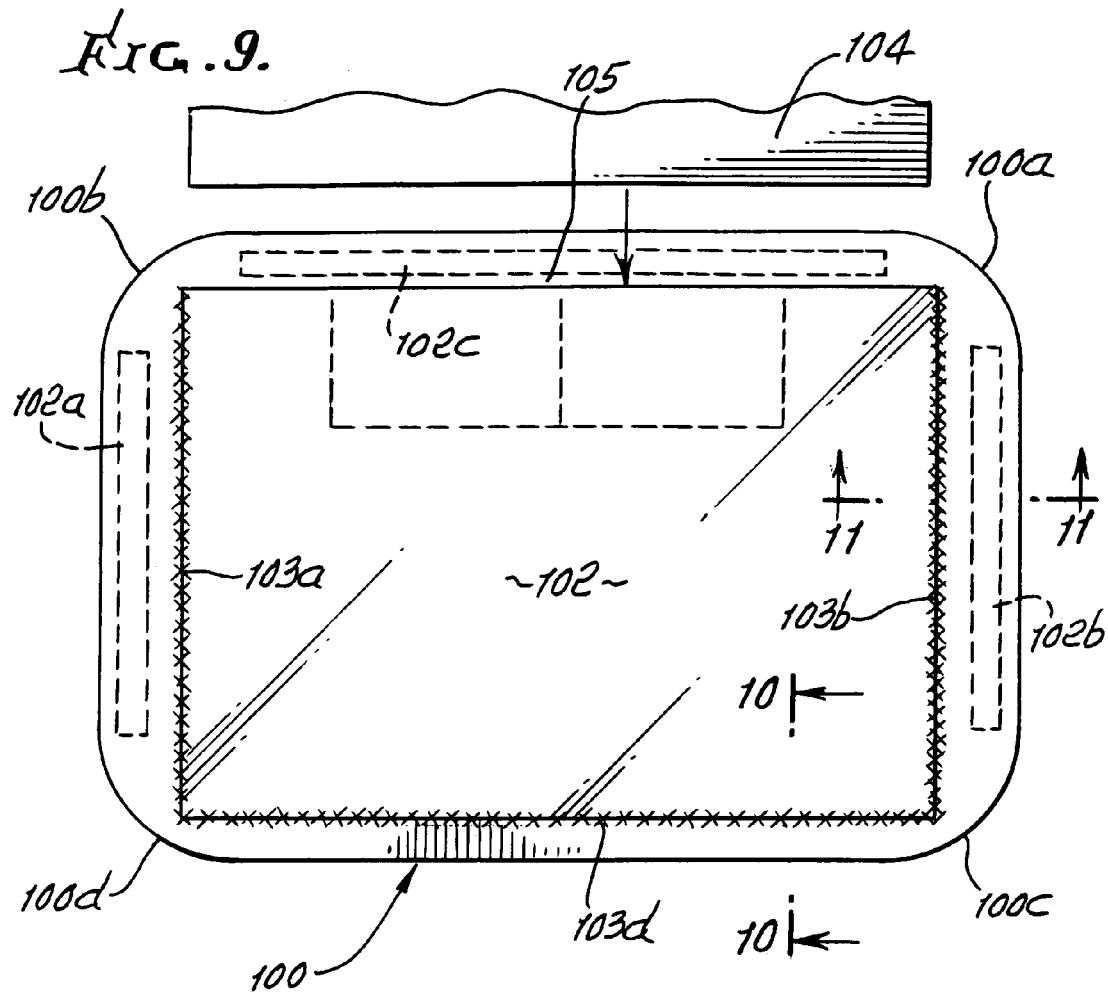
FIG. 9 is a frontal view of a modified assembly that is preferred.
Figure 10:
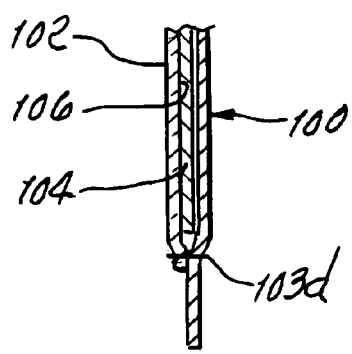
FIG. 10 is a section taken on lines 10-10 of FIG. 9.
Figure 11:
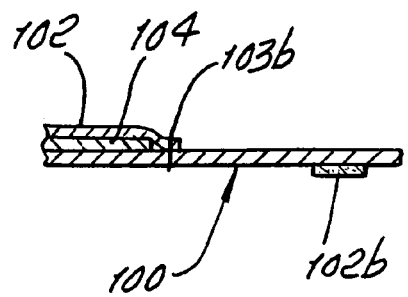
FIG. 11 is a section taken on lines 11-11 of FIG. 9.

Rectangular transparent panel 102 is affixed to the front side of the jacket 100, as by stitching attachment lengthwise and widthwise, as at 103*a*, 103*b* and 103*d* as seen in FIGS. 9 and 12. There is no such attachment along the upper edge of the panel 103, in order to allow insertion and removal of a backer 104, such as a cardboard stiffener insert panel, between the main extent of the cover 100 and the transparent sheet or panel 102. The absence of stitching along the edge 100*b* of panel 102 enables such backer insertion and removal, and allows folding of the jacket after 104 is removed from the entrance 105 and the space 106 between jacket 100 and the visual display transparent panel 102. See also in this regard FIG. 1-4.

As shown in FIG. 15, the construction is such that retention pockets 107 are provided at the curved interior corners of the jacket, that do not interfere with the transparent sheet, and backer, at their corners, in relaxed (un-stretched) condition of the jacket, thereby enabling ready application of the jacket to the computer cover or lid corners, as described above and shown in FIG. 15. Such application reduces the sizes of the pockets, as shown in FIGS. 12 and 14. The pockets are stretchably fitted over the computer cover corners to adjust the position of the jacket, prior to manual pressing of the jacket edge portions to the surface of the cover, as at the locations of the adhesive strips 102*a*-102*c*, to secure the jacket in supported position, both at the jacket corners and at the locations of the adhesive strips.

As shown in FIG. 16, a pocket-like carrier 110 for a hand-held electronic device (radio, ipod, etc.) 111 is optionally provided to be removably attached (as by hook and pile) at 112 to the jacket, as at or along its edge 100*e*. This enables ready communication while using the invention attached to a computer. In this regard, the transparent panel may be replaced by a computer monitor, as described in FIG. 5. The device 111 may be electrically connected to that monitor, or to the main monitor, as by plug connection indicated at 113.

FIG. 15*a* is like FIG. 15, except that the jacket at corners 101*a*' do not completely overlap the lap top corner 101*b* but rather extend to or proximate the lap top corner or edge 101*b*. Adhesive structure or layer 102*e* on the jacket extends toward the corner 101*a*' to retain the jacket to the cover.

What is claimed is:

1. A display assembly attached to a lap top computer cover, having a face, longitudinally extending laterally spaced edges, and a laterally extending upper edge, comprising in combination: a) a jacket received onto the cover, said jacket having edges extending externally adjacent corresponding of said cover edges, b) and means carried by said jacket for visually displaying an image or images, in registration with said face, c) the jacket defining flexible corners extending to and terminally fitting outermost edge surfaces of corners defined by the cover corners, d) the jacket being flexible and stretchable; wherein said jacket is flexible throughout its major extent; and wherein said jacket corners consist of yieldably flexible material.

2. The combination of claim 1 wherein said means defines a substantially rectangular display zone for said image or images, and adapted to extend opposite said cover face.

3. The combination of claim 1 wherein said jacket flexible corners terminating outwardly at outermost surfaces of rigid corners defined by said cover, which is rectangular.

4. The combination of claim 3 wherein said means define a transparent panel adapted to extend in closely spaced relation to said face, with an image display sheet received therebetween.

5. The combination of claim 1 wherein said means define a transparent panel adapted to extend in closely spaced relation to said face, with an image display sheet received therebetween.

6. The combination of claim 5 including a slot shaped opening located laterally adjacent a lateral edge of said transparent panel for passing said display sheet into the space between said transparent panel and the cover face.

7. The combination of claim 6 wherein said means defines a transparent panel adapted to extend in closely spaced relation to said face, with an image display sheet received therebetween.

8. The combination of claim 5 including storage pockets carried by the jacket at a side thereof facing said transparent panel.

9. The combination of claim 1 wherein said means comprises a digital frame.

10. The combination of claim 1 wherein said means comprises a computer monitor.

11. The combination of claim 1 wherein said means comprises a transparent rectangular plastic sheet having four edges, three of which are sealed to the jacket, and the fourth edge not being sealed to the jacket to allow insertion of a display sheet past said fourth edge and between the jacket and the transparent sheet, at one side of the jacket.

12. The combination of claim 11 wherein said jacket edges are defined by plastic strips heat sealed to the jacket at the opposite side thereof.

13. The combination of claim 12 wherein there are four of said strips, only three of which are heat sealed to the jacket, the fourth strap along its length being loose from the jacket.

14. The combination of claim 1 including an electronic device of hand-held size releasably carried by the jacket, proximate the periphery thereof.

15. The combination of claim 14 including a carrier for said device, and which is releasably carried by the jacket, proximate the periphery thereof.

16. The combination of claim 15 including a press-on attachment on the carrier and configured to press-on attach to a peripheral portion of the jacket.

17. The combination of claim 1 wherein the jacket has flexible corners defining retention pockets that are resiliently stretchable, and that are curved inwardly over main extent of the jacket, said pockets stretching to reduce their un-stretched size so as to closely and retainingly fit over corners of the computer cover.

18. The method of adding substantial visual display capability to a lap top computer cover having a front face, longitudinally extending laterally spaced edges, and a laterally extending upper edge that includes a) providing a jacket having edges adapted to extend adjacent corresponding of said cover edges, b) there being means carried by the jacket for visually displaying an image or images, c) and applying the jacket to said cover, to terminally fit jacket edges to outermost exposed surfaces of corners defined by cover edges; wherein the jacket is flexible and stretchable throughout its major extent; and wherein said jacket defines flexible and stretchable corners to closely fit over rigid corners defined by said cover, which is rectangular.

19. The method of claim 18 wherein said means defines a transparent panel adapted to extend in closely spaced relation with said face, and including inserting an image display sheet between said panel and said face.

20. The method of claim 18 wherein said means comprises a digital frame.

21. The method of claim 18 wherein said means comprises a computer monitor.

22. A display assembly attached to a laptop computer display unit cover having a face, longitudinally extending laterally spaced edges, and a laterally extending upper edge, comprising in combination: a) a jacket having a side receivable against the cover, said jacket having edges extending externally in corresponding relation to said cover edges, and carried by the cover, b) and apparatus carried by said jacket for visually displaying an image or images, in registration with said face, c) the jacket defining flexible corners extending to and terminally fitting outermost edge surfaces of corners defined by the cover corners, d) the jacket being flexible and stretchable; wherein said jacket is flexible throughout its major extent; and wherein said jacket corners consist of yieldably flexible material.

23. The combination of claim 22 wherein said apparatus defines a substantially rectangular display zone for said image or images, and extending opposite said cover face.

24. The combination of claim 23 wherein said apparatus defines a transparent panel extending in opposed spaced relation to said face, with an image display sheet received therebetween.

25. The combination of claim 24 including a slot shaped opening located laterally adjacent a lateral edge of said transparent panel for passing said display sheet into the space between said transparent panel and said face.

26. The combination of claim 22 including retention structure holding the jacket against said face.

27. The combination of claim 22 wherein said apparatus comprises a transparent rectangular plastic sheet having four edges, three of which are operatively retained to the jacket, and the fourth edge not being operatively retained to the jacket to allow insertion of a display sheet past said fourth edge and between the jacket and the transparent sheet, at one side of the jacket.

28. The method of adding substantial visual display capability to a laptop computer display unit cover having a front face, longitudinally extending laterally spaced edges, and a laterally extending upper edge that includes a) providing a flexible and stretchable panel having a side applied against said face and edges extending in corresponding relation to said cover edges, b) there being apparatus carried by the panel for visually displaying an image or images, c) the panel applied to said cover to be removably carried by the cover, d) applying the panel to said cover, to terminally fit panel edges to outermost exposed surfaces of corners defined by cover edges; wherein the panel is flexible throughout its major extent, and about said apparatus; and wherein said panel defines flexible and stretchable corners to closely fit over rigid corners defined by said cover, which is rectangular.

29. The method of claim 28 wherein said apparatus defines a transparent sheet extending in closely spaced relation with said face, and including inserting an image display sheet between said transparent sheet and said face, to be viewed in a direction toward the transparent sheet.

30. A display assembly attachable to a lap top computer cover, having a face, longitudinally extending laterally spaced edges, and a laterally extending upper edge, comprising in combination: a) a jacket receivable onto the cover, said jacket having edges adapted to extend externally adjacent corresponding of said cover edges, b) and means carried by said jacket for visually displaying an image or images, in registration with said face, c) said jacket defining flexible corners to closely fit proximate corners defined by said cover, which is rectangular, d) adhesive structure attached to the jacket to releasably adhere to the cover for positively retaining the jacket to the cover, but enabling forcible release therefrom, e) the jacket having outermost stretchable edges that terminate at outermost cover edges at cover corners, whereby the jacket can be easily and rapidly peeled off said cover corners, f) the jacket being flexible and stretchable; wherein said jacket is flexible throughout its major extent.

31. The combination of claim 30 wherein said means defines a transparent panel having corners extending toward said flexible corners.

32. The combination of claim 31 wherein the panel has four edges, three of which are attached to the jacket.

33. The combination of claim 32 wherein the fourth edge of the panel is in spaced relation from the jacket to define therewith an entrance for insertion of sheet material.

34. The combination of claim 33 wherein said sheet material includes one of the following:
   i) a backer sheet,
   ii) a visual display sheet viewable through the transparent panel,
   iii) both a backer-sheet and a visual display sheet.

35. The combination of claim 31 including a storage pocket or pockets carried by the jacket at a side thereof facing toward said transparent panel.

36. The combination of claim 30 wherein the jacket flexible corners define retention pockets stretchable to fit over corners of the cover.

37. The combination of claim 36 wherein said pockets are resiliently stretchable, and curved inwardly over main extent of the jacket.

38. The combination of claim 37 wherein said pockets are curved inwardly at the opposite side of the jacket from said transparent panel.

39. The combination of claim 30 wherein the jacket corners extend proximate edges defined by the cover corners.

40. A display assembly attached to a lap top computer cover, having a face, longitudinally extending laterally spaced edges, and a laterally extending upper edge, comprising in combination: a) a jacket receivable onto the cover, said jacket having a main body portion in registration with said face, and edges configured and adapted to extend externally adjacent corresponding of said cover edges, b) said jacket defining flexible corners to closely extend proximate corners defined by said cover, which is rectangular, and c) structure attached to the jacket to releasably adhere to the cover for positively retaining the jacket to the cover, but enabling forcible release therefrom, d) means carried by said jacket for visually displaying an image or images, in registration with said face, e) the jacket defining flexible corners extending to and terminally fitting outermost edge surfaces of corners defined by the cover corners, f) the jacket being flexible and stretchable; wherein said jacket is flexible throughout its major extent.

41. The combination of claim 40 wherein the jacket defines at least one article pocket which is resiliently stretchable, and curved inwardly over main extent of the jacket.

* * * * *